US008880281B2

(12) United States Patent
Giles et al.

(10) Patent No.: US 8,880,281 B2
(45) Date of Patent: Nov. 4, 2014

(54) EVENT DATA RECORDER SYSTEM AND METHOD

(75) Inventors: Peter John Giles, Ypsilanti, MI (US); James T. Kurnik, Linden, MI (US)

(73) Assignee: GM Global Technology Operations LLC

( * ) Notice: Subject to any disclaimer, the term of this patent is extended or adjusted under 35 U.S.C. 154(b) by 753 days.

(21) Appl. No.: 12/859,807

(22) Filed: Aug. 20, 2010

(65) Prior Publication Data

US 2011/0213526 A1 Sep. 1, 2011

Related U.S. Application Data

(60) Provisional application No. 61/309,249, filed on Mar. 1, 2010.

(51) Int. Cl.
*G01M 17/00* (2006.01)
*G06F 7/00* (2006.01)
*G06F 19/00* (2011.01)
*G07C 5/08* (2006.01)

(52) U.S. Cl.
CPC .................................... *G07C 5/085* (2013.01)
USPC .......... 701/33.4; 702/187; 702/182; 702/183; 701/29.1

(58) Field of Classification Search
CPC ........................................................ G07C 5/085
USPC ......................................................... 701/33.4
See application file for complete search history.

(56) References Cited

U.S. PATENT DOCUMENTS

| | | | | |
|---|---|---|---|---|
| 4,138,697 | A * | 2/1979 | Russillo et al. | 360/6 |
| 4,608,638 | A * | 8/1986 | Tsikos | 701/32.1 |
| 5,754,449 | A * | 5/1998 | Hoshal et al. | 702/187 |
| 5,790,427 | A * | 8/1998 | Greer et al. | 702/127 |
| 5,815,071 | A * | 9/1998 | Doyle | 340/439 |
| 6,393,347 | B1 * | 5/2002 | Snyder et al. | 701/33.4 |
| 6,601,015 | B1 * | 7/2003 | Milvert et al. | 702/182 |
| 7,020,546 | B2 | 3/2006 | Nagai et al. | |

(Continued)

FOREIGN PATENT DOCUMENTS

| | | | |
|---|---|---|---|
| CN | 1708678 | A | 12/2005 |
| CN | 101176121 | A | 5/2008 |
| WO | WO-2004044546 | A1 | 5/2004 |

OTHER PUBLICATIONS

Department of Transportation, National Highway Traffic Safety Administration, 49 CFR Part 563, Event Data Recorders, Aug. 2006.*

*Primary Examiner* — Calvin Cheung
*Assistant Examiner* — Krishnan Ramesh

(57) ABSTRACT

An event data recorder (EDR) system includes an event identification module, a parameter selection module, and an event recorder module. The event identification module identifies occurrences of a first event and second event of M predetermined events based on operating conditions of an automotive vehicle. The parameter selection module selects a first set of parameters to record from N predetermined parameters when the first event occurs. The parameter selection module selects a second set of parameters to record from the N predetermined parameters when the second event occurs. The event recorder module records data corresponding to the first set of parameters when the first event occurs and records data corresponding to the second set of parameters when the second event occurs. M and N are integers greater than 1 and the first set includes at least one parameter that is different from the parameters included in the second set.

19 Claims, 3 Drawing Sheets

(56) References Cited

U.S. PATENT DOCUMENTS

| | | | | |
|---|---|---|---|---|
| 7,089,096 | B2 * | 8/2006 | Liebl et al. | 701/33.4 |
| 7,093,070 | B2 * | 8/2006 | Rowlan | 711/115 |
| 7,117,075 | B1 * | 10/2006 | Larschan et al. | 701/29.6 |
| 7,231,285 | B2 * | 6/2007 | Noguchi | 701/33.4 |
| 7,266,433 | B2 * | 9/2007 | Ozawa | 701/33.4 |
| 7,359,821 | B1 * | 4/2008 | Smith et al. | 702/113 |
| 7,489,235 | B2 * | 2/2009 | Maesono et al. | 340/438 |
| 2001/0005804 | A1 * | 6/2001 | Rayner | 701/35 |
| 2002/0004695 | A1 * | 1/2002 | Glenn et al. | 701/35 |
| 2004/0172177 | A1 * | 9/2004 | Nagai et al. | 701/29 |
| 2005/0288903 | A1 * | 12/2005 | Jackson et al. | 702/187 |
| 2006/0047384 | A1 * | 3/2006 | Robinson et al. | 701/35 |
| 2006/0058591 | A1 * | 3/2006 | Garboski et al. | 600/301 |
| 2006/0142914 | A1 * | 6/2006 | Yokogawa | 701/35 |
| 2006/0146436 | A1 * | 7/2006 | Goodwin et al. | 360/69 |
| 2006/0212195 | A1 * | 9/2006 | Veith et al. | 701/35 |
| 2006/0287776 | A1 * | 12/2006 | Giles et al. | 701/1 |
| 2007/0032930 | A1 * | 2/2007 | Ozawa | 701/35 |
| 2007/0050109 | A1 * | 3/2007 | Ozawa | 701/35 |
| 2007/0050400 | A1 * | 3/2007 | Durbin | 707/102 |
| 2007/0076312 | A1 * | 4/2007 | Jordan | 360/32 |
| 2007/0150138 | A1 * | 6/2007 | Plante | 701/35 |
| 2007/0150141 | A1 * | 6/2007 | Lo | 701/35 |
| 2007/0217761 | A1 * | 9/2007 | Chen et al. | 386/86 |
| 2007/0219685 | A1 * | 9/2007 | Plante | 701/35 |
| 2007/0219686 | A1 * | 9/2007 | Plante | 701/35 |
| 2008/0059020 | A1 * | 3/2008 | Sato | 701/35 |
| 2008/0071443 | A1 * | 3/2008 | Cox | 701/35 |
| 2008/0122603 | A1 * | 5/2008 | Plante et al. | 340/439 |
| 2008/0147266 | A1 * | 6/2008 | Plante et al. | 701/35 |
| 2008/0147267 | A1 * | 6/2008 | Plante et al. | 701/35 |
| 2008/0226261 | A1 * | 9/2008 | Himeno et al. | 386/105 |
| 2008/0234890 | A1 * | 9/2008 | Okada et al. | 701/35 |
| 2008/0255723 | A1 * | 10/2008 | Sano | 701/35 |
| 2008/0312787 | A1 * | 12/2008 | Regnard De Lagny et al. | 701/35 |
| 2009/0082967 | A1 * | 3/2009 | Hara et al. | 701/225 |
| 2009/0136213 | A1 * | 5/2009 | Calisa et al. | 386/119 |
| 2009/0177354 | A1 * | 7/2009 | Agrawal et al. | 701/35 |
| 2010/0138094 | A1 * | 6/2010 | Stark et al. | 701/23 |
| 2010/0250060 | A1 * | 9/2010 | Maeda et al. | 701/35 |
| 2010/0318258 | A1 * | 12/2010 | Katayama et al. | 701/33 |
| 2011/0046832 | A1 * | 2/2011 | Francoeur | 701/22 |
| 2011/0153199 | A1 * | 6/2011 | Morimoto et al. | 701/201 |
| 2011/0190973 | A1 * | 8/2011 | Giles | 701/29 |
| 2011/0213526 | A1 * | 9/2011 | Giles et al. | 701/35 |
| 2012/0197481 | A1 * | 8/2012 | Takeda | 701/31.4 |

* cited by examiner

EVENT DATA RECORDER SYSTEM AND METHOD

CROSS-REFERENCE TO RELATED APPLICATIONS

This application claims the benefit of U.S. Provisional Application No. 61/309,249, filed on Mar. 1, 2010. The disclosure of the above application is incorporated herein by reference in its entirety.

FIELD

The present disclosure relates to systems and methods for recording vehicle event data based on predetermined criteria and/or driver input.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An event data recorder (EDR) is a device installed on a vehicle to record information related to an event involving the vehicle. Conventional EDRs record information related to vehicle events such as crashes or accidents. EDRs are typically included in one or more control modules, such as a diagnostic module, an engine control module, a stability control module, and a four-wheel steering module. These modules are located in various positions in a vehicle and record events associated with various systems in the vehicle.

An EDR typically starts recording information when a triggering event occurs, such as a sudden change in wheel speed, and continues to record until a recorded event (e.g., accident) is over or until a recording time is expired. Information recorded by the EDR can be collected after the event and analyzed to determine what a vehicle was doing before, during, and/or after the event.

SUMMARY

An event data recorder (EDR) system includes an event identification module, a parameter selection module, and an event recorder module. The event identification module identifies occurrences of a first event and second event of M predetermined events based on operating conditions of an automotive vehicle. The parameter selection module selects a first set of parameters to record from N predetermined parameters when the first event occurs. The parameter selection module selects a second set of parameters to record from the N predetermined parameters when the second event occurs. The event recorder module records data corresponding to the first set of parameters when the first event occurs and records data corresponding to the second set of parameters when the second event occurs. M and N are integers greater than 1 and the first set includes at least one parameter that is different from the parameters included in the second set.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
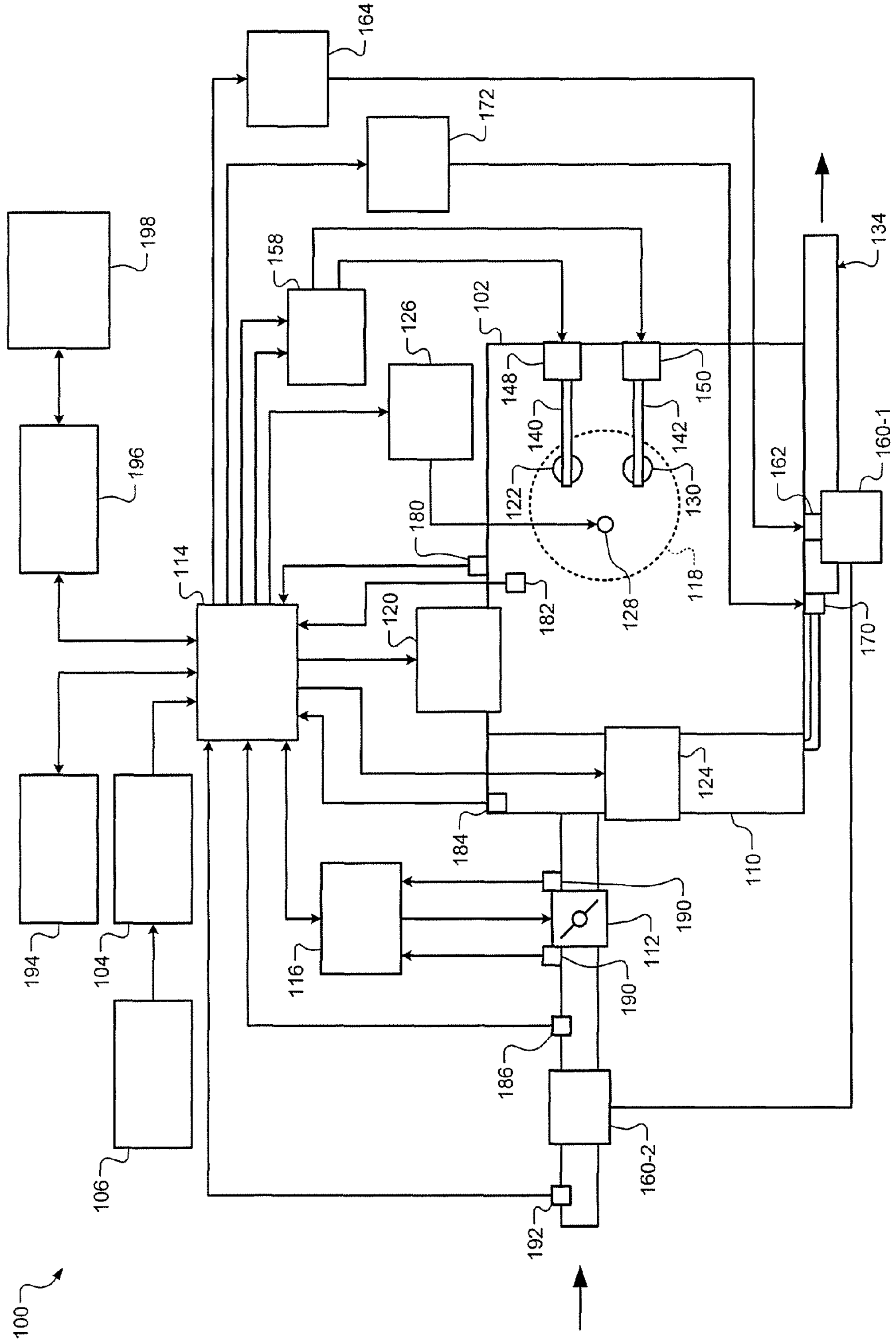
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A conventional event data recorder (EDR) requires a substantial amount of memory for configuring soft-coded triggering events and for storing data that is continuously recorded during recording times ranging from one to five seconds. The amount of memory available in control modules that include EDRs is limited. Thus, the memory used for event configuration and continuously recorded data limits the number of events and parameters that may be recorded.

In addition, an EDR typically records the same parameters regardless of which triggering event occurs. Thus, the number of parameters recorded may be more or less than desired for a triggering event. As a result, memory usage may not be efficient and desired data may not be recorded.

An EDR system and method of the present disclosure identifies an event occurring based on vehicle operating conditions, selects parameters to record based on the identified event, and records data for the selected parameters. The identified event is one of multiple predetermined events and the recorded parameters are selected from multiple predetermined parameters. The predetermined events and the predetermined parameters may be hard-coded. The identified event is not limited to vehicle accidents and may be an event for which data is desired to analyze vehicle performance, such as a fault code event. A single value detected at the exact time of the identified event may be recorded for each of the selected parameters.

The predetermined events that are identified as they occur may be a subset of a larger number of predetermined events, and the predetermined events included in the subset may be selected as desired for recording purposes. A chronological history or order of the identified events may be recorded. A number of occurrences may be determined for each of the predetermined events, even the predetermined events that are not selected for recording purposes.

An EDR system of the present disclosure may include an EDR activation device and multiple EDR modules associated with multiple vehicle systems. The EDR activation device enables a driver to activate event data recording and may be atypical control included in a dashboard, such as a radio. The EDR activation device may activate a main EDR module, such as an engine control module (ECM), when the driver activates event data recording. In turn, the ECM may activate other EDR modules located at various other positions in a vehicle to simultaneously record data for multiple vehicle systems.

Recording data for predetermined events rather than configured events saves memory that would otherwise be used for event configuration. Selecting the events to be identified and selecting the parameters to record for each identified event also saves memory. The memory saved via these selections would otherwise be used to record data for events and parameters that are not of interest when evaluating vehicle performance. Recording a single value for each of the selected parameters saves memory that would otherwise be used to store continuously recorded data. These memory savings enable data recording for a greater number of events and parameters relative to data recoding via conventional EDRs. Thus, the recorded events are not limited to vehicle accidents and may include various events of interest in vehicle analysis.

Including an EDR activation device and activating other EDR modules on a vehicle using a main EDR module provides a mechanism for a driver to record event data for an entire vehicle when desired. This mechanism may facilitate diagnosing vehicle performance concerns of a driver. For example, a driver may activate the EDR system when the driver observes a noise, such a clunk, and a technician may later retrieve data from the EDR system to analyze the events taking place on the vehicle when the noise was observed.

Referring now to FIG. 1, an exemplary engine system including an EDR system of the present disclosure is shown. The EDR system is shown in the context of the engine system for exemplary purposes only, as the EDR system may be included in other vehicle systems, such as a driveline system, a fuel system, an exhaust system, a chassis system, and a body system. An ECM receives inputs from sources including an EDR activation device and records event data related to the engine system based on the inputs received.

Figure 2:
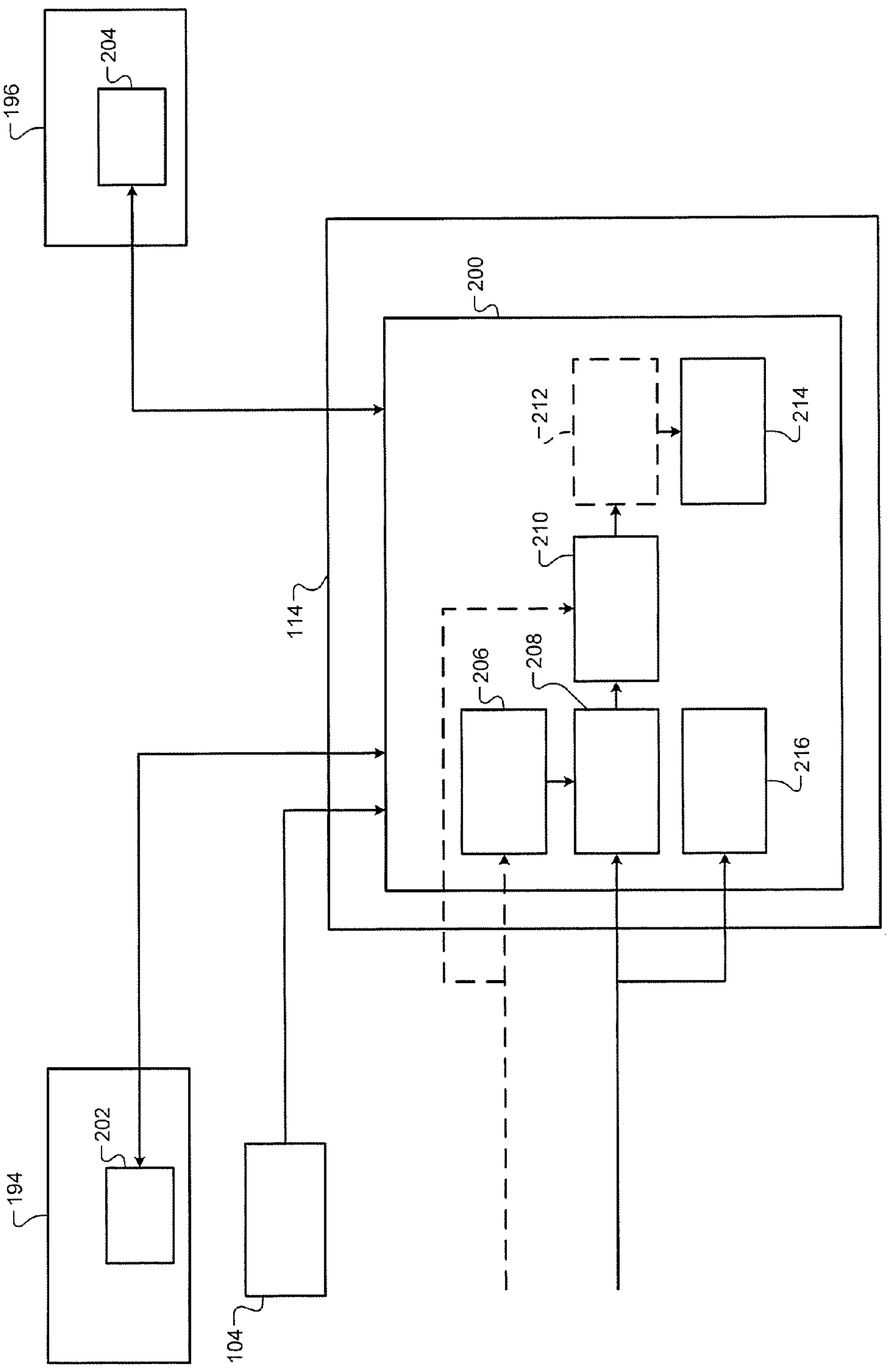
FIG. 2 is a functional block diagram of an exemplary event data recorder control system according to the principles of the present disclosure.

Referring now to FIG. 2, the ECM and other modules included in the engine system of FIG. 1 are shown in greater detail. The ECM includes an EDR module that records event data related to the engine system. The EDR module includes modules that execute the EDR techniques discussed above and illustrated in FIG. 3. These techniques include selecting events to record, identifying the selected events as they occur, selecting parameters to record for the identified event, and recording data for the selected parameters.

The EDR module also records data when activated by driver input that is transmitted via the EDR activation device. A transmission control module (TCM) and a hybrid control module (HCM) include EDR modules that record event data associated with a transmission system and a hybrid system, respectively. The EDR module in the ECM activates the EDR modules in the TCM and the HCM when the driver input activates the EDR module in the ECM.

Referring again to FIG. 1, a functional block diagram of an exemplary engine system 100 is presented. The engine system 100 includes an engine 102 that combusts an air/fuel mixture to produce drive torque for a vehicle based on driver input from a driver input module 104. An EDR activation device 106 communicates with the driver input module 104 to activate event data recording. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

The EDR activation device 106 enables a driver to activate event data recording and may be a typical control included in a dashboard, such as a radio. The driver may activate event data recording using an activation sequence that does not interfere with vehicle operating conditions, such as may occur if the driver touched a tow-haul button and caused a transmission to shift. The driver may activate event data recording when the driver observes a particular vehicle behavior, such as producing a noise, and the driver would like to record event data related to the observed vehicle behavior. The EDR activation device 106 activates the ECM 114 to record event data by, for example, providing an EDR activation signal to the driver input module 104. When the driver input module 104 receives the EDR activation signal, the driver input module 104 activates the ECM 114 to record event data via the driver input.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 based on a signal from the ECM 114. Energizing the spark plug 128 generates a spark that ignites the air/fuel mixture in the cylinder 118. The timing of the spark may be specified relative to the time when the piston is at top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. In addition, the spark actuator module 126 may have the ability to vary the timing of the spark for a given firing event even when a change in the timing signal is received after the firing event immediately before the given firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the speed of the crankshaft in revolutions per minute (RPM) using a RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module (TCM) 194 to coordinate shifting gears in a transmission (not shown). For example, the ECM 114 may reduce engine torque during a gear shift. The ECM 114 may communicate with a hybrid control module (HCM) 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the TCM 194, and the HCM 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to the number of activated cylinders, fueling rate, intake and exhaust cam phaser angles, boost pressure, and EGR valve opening area, respectively. The ECM 114 may control actuator values in order to cause the engine 102 to generate a desired engine output torque.

Referring again to FIG. 2, the ECM 114, the TCM 194, and the HCM 196 respectively include EDR modules 200, 202, and 204. The EDR module 200 includes an event selection module 206, an event identification module 208, a parameter selection module 210, an event order module 212, a parameter recorder module 214, and an event counter module 216.

The event selection module 206 selects events to be identified as they occur from multiple predetermined events, which may be stored in the event selection module 206. The event selection module 206 may make this selection based on event selection instructions indicated by a signal received from an external device and stored in the event selection module 206. The external device signal may be a hardwired signal received from a handheld scan tool or a wireless signal received from a satellite communication network.

The predetermined events may include a fault code event or other events that may be of interest when analyzing vehicle performance. For example only, the predetermined events may include a fault code set, a transmission shift flare, a RPM sensor signal drop, and a control module reset. The event selection module 206 generates an event selection signal indicating the predetermined events that are selected to be identified as they occur.

The event identification module 208 receives the event selection signal from the event selection module 206 and identifies the selected events that occur. The event identification module 208 also receives an operating conditions signal that indicates operating conditions of the engine system 100. The operating conditions signal may indicate sensor and actuator values and may be received from sensors and modules in the engine system 100, including other modules in the ECM 114. The event identification module 208 identifies the selected events that occur based on the operating conditions.

The event identification module 208 identifies the selected events occurring when the operating conditions satisfy predetermined criteria. For example, the event identification module 208 may identify a RPM sensor signal drop when the crankshaft speed received from the RPM sensor 180 is less than a threshold speed. The threshold speed may vary based on actuator values determined in the ECM 114, such as the desired air/fuel ratio and the throttle opening area. The event identification module 208 generates an event identification signal indicating the selected event identified as occurring.

The parameter selection module 210 receives the event identification signal from the event identification module 208 and selects parameters to record from multiple predetermined parameters based on the identified event. For example, when the identified event is a transmission shift flare, the parameter selection module 210 may select parameters such as the crankshaft speed, a turbine shaft speed (TSS), an output shaft speed (OSS), a shift identification, a torque converter clutch (TCC) ratio, and a transmission gear ratio. The parameter selection module 210 may receive the external device signal, store parameter selection instructions indicated by the external device signal, and select parameters based on the parameter selection instructions.

The parameter selection module 210 generates a parameter selection signal indicating the parameters selected for recording. The parameter selection module 210 may output the parameter selection signal to the event order module 212. Alternatively, the event order module 212 may be omitted and the parameter selection module 210 may output the parameter selection signal directly to the parameter recorder module 214.

The event order module 212 may receive the parameter selection signal from the parameter selection module 210 and may determine an event order (i.e., the chronological order of the identified event relative to other identified events). The event order module 212 may generate an event order signal indicating the event order and may output the event order signal to the parameter recorder module 214. As discussed above, the event order module 212 may be omitted. In this case, the parameter selection module 210 may designate the event order as one of the parameters selected for recording and the parameter recorder module 214 may determine the event order.

The parameter recorder module 214 receives the parameter selection signal from the parameter selection module 210 and records in memory data corresponding to the selected parameters. The data recorded may be a single value that corresponds to the exact time of the identified event. Alternatively, the parameter recorder module 214 may start recording data when the identified event occurs and may continue for a predetermined recording period and/or until a predetermined terminating event occurs. The data recorded by the parameter recorder module 214 may be retrieved by an external device such as a handheld scan tool or a satellite communications network.

The event counter module 216 receives the operating conditions signal and determines the number of occurrences for the predetermined events based thereon, even those events not selected to be identified as they occur. The event counter module 216 records an event count (i.e., a number of occurrences per event) for each of the predetermined events. The event count may be recorded for all of the predetermined events without requiring a significant amount of memory. Providing access to a recorded event count for all of the predetermined events may be useful when analyzing vehicle performance. The event count is stored in memory and may be retrieved by an external device such as a handheld scan tool or a satellite communications network.

In addition to recording event data when events occur, the EDR module 200 receives the driver input from the driver input module 104 and records event data when activated by the driver input. When activated by the driver input, the EDR module 200 activates the EDR modules 202, 204 and may notify the driver that event data recording is activated via the EDR activation module 106 of FIG. 1. When activated, the EDR modules 200, 202, 204 record event data associated with the engine system 100 of FIG. 1, a transmission system (not shown), and a hybrid system (not shown), respectively. The EDR modules 200, 202, 204 may continuously record event data for a predetermined recording period and/or until a predetermined terminating event occurs. The predetermined terminating event may be a driver turning an ignition key to an off position or acting on the EDR activation device 106. In this manner, event data recording for multiple vehicle systems may be prompted by driver input.

The EDR module 200 may notify a driver via a visual indicator when the EDR modules 200, 202, 204 are deactivated. The visual indicator may be included in the EDR activation module 106, may be a light or a message, and may be located on a dashboard. The visual indicator may also inform the driver that event data has been recorded and is retrievable.

Figure 3:
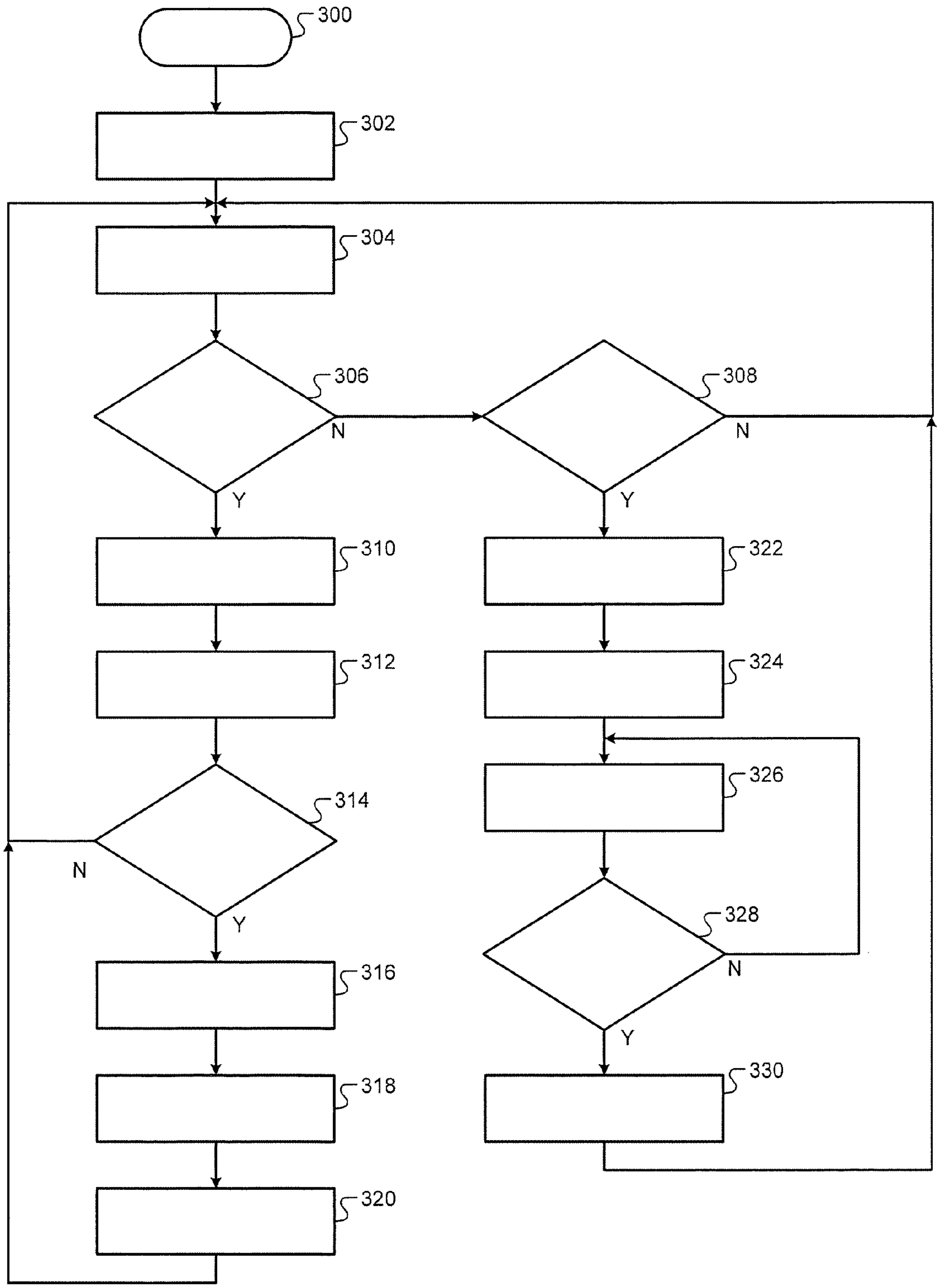
FIG. 3 illustrates a method for recording vehicle event data.

Referring now to FIG. 3, a method for recording vehicle event data is illustrated. Control begins at 300. At 302, control selects events to be identified from multiple predetermined events based on stored event selection instructions. At 304, control monitors vehicle operating conditions. Vehicle operating conditions may include values detected, determined, and/or commanded by modules and/or sensors in a vehicle.

At 306, control determines whether vehicle operating conditions satisfy predetermined event criteria. The predetermined event criteria may be single values or value ranges corresponding to the vehicle operating conditions. If 306 is false, control continues at 308. If 306 is true, control continues at 310.

At 310, control identifies the event satisfying the predetermined event criteria using a numeric event label. Identifying the event using a numeric event label rather than an alphabetic or alphanumeric description saves memory that would otherwise be used to identify events. At 312, control determines an event count for the identified event (i.e., the number of occurrences of the identified event). Control may determine the event count for identified events, selected events, and/or events that are neither select nor identified.

At 314, control determines whether the identified event is one of the selected events. If 314 is false, control returns to 304. If 314 is true, control continues at 316. At 316, control determines an event order of the identified event (i.e., the chronological order of the identified event relative to other identified events). At 318, control selects parameters to record for the identified event. The recording parameters may vary depending on the event identified. At 320, control records data corresponding to the selected parameters in memory. Control may record a single value corresponding to the selected parameters or continuously record data corresponding to the selected parameters for a predetermined period and/or until a predetermined terminating event occurs.

At 308, control determines whether an EDR activation input is received. The EDR activation input may be the driver input provided by the driver input module 104 of FIG. 1. If 308 is false, control returns to 304. If 308 is true, control continues at 322. At 322, control activates an EDR in a central control module such as the ECM 114 of FIG. 1. At 324, control activates EDRs in other control modules using the central control module. At 326, control records parametric data for multiple vehicle systems using the activated EDRs.

At 328, control determines whether event data recording completion criteria is satisfied. If 328 is false, control returns to 326. If 328 is true, control continues at 330. At 330, control deactivates the activated EDRs.

Control may determine that event data recording completion criteria is satisfied when a predetermined recording period has elapsed and/or when a predetermined terminating event occurs. Control may record for a fixed recording period until the predetermined terminating event occurs and may overwrite oldest-recorded data with newest-recorded data. The amount of oldest-recorded data that is overwritten may correspond to a difference between the fixed recording period and an actual recording period.

Referring now to Table 1 below, an example of parametric data recorded by the parameter recorder module 214 of FIG. 2 is shown. The parametric data shown corresponds to a single identified event. The name of the recorded parameter is shown in the column on the left. The value of the recorded parameter is shown in the column on the right. The "event #" is the event order of the identified event. As several of the parameters shown relate to an engine or a transmission, the identified event may be an engine-related event such as a misfire or a transmission-related event such as a shift flare.

TABLE 1

| Recorded Parametric Data | |
|---|---|
| Name | Value |
| event # | 3 |
| event label | 22 |
| engine speed | 1022 |
| engine load | 700% |
| engine torque | 75 |
| throttle angle | 65 |
| TSS | 1022 |
| OSS | 4500 |
| shift id | 24 (1-3) |
| TCC Ratio | 1 |
| trans gear ratio | 4.6 |
| mileage | 1022 |
| trans temp | 88 |
| engine temp | 102 |
| ambient temp | 45 |

Referring now to Table 2 below, an example of a chronological order of the identified events recorded by the event order module 212 of FIG. 2 is shown. The orders of the identified events are shown in the column on the left. The numerated labels of the identified events are shown in the column on the right.

TABLE 2

| History of Recorded Events | |
|---|---|
| Order | Event Label |
| 1 | 11 |
| 2 | 14 |
| 3 | 22 |
| 4 | 65 |
| 5 | 110 |
| 6 | 424 |
| 7 | 122 |

Referring now to Table 3 below, an example of an event count (i.e., number of occurrences per event) recorded by the event counter module 216 of FIG. 2 is shown. The event counts are shown in the column on the left. The numerated labels of the events are shown in the column on the right. The events may include all of the predetermined events, even those not recorded.

TABLE 3

| Number of Occurrences per Event | |
|---|---|
| Event Count | Event Label |
| 5 | 11 |
| 2 | 14 |
| 3 | 22 |
| 6 | 65 |
| 11 | 110 |
| 2 | 424 |
| 4 | 122 |

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An event data recorder (EDR) system, comprising:

an event identification module that identifies occurrences of a first event and second event of M predetermined events based on operating conditions of an automotive vehicle;

a parameter selection module that selects a first set of parameters to record from N predetermined parameters when the first event occurs and that selects a second set of parameters to record from the N predetermined parameters when the second event occurs; and an event recorder module that records data corresponding to the first set of parameters when the first event occurs and that records data corresponding to the second set of parameters when the second event occurs, wherein M and N are integers greater than 1 and the first set includes at least one parameter that is different from the parameters included in the second set.

2. The EDR system of claim 1, wherein the event recorder module records a single value for each parameter included in the first and second sets.

3. The EDR system of claim 1, wherein the event recorder module records data corresponding to the first and second sets of parameters for a predetermined period.

4. The EDR system of claim 1, further comprising an event order module that determines a chronological order of each of the M predetermined events that occur.

5. The EDR system of claim 1, further comprising an event selection module that selects the M predetermined events to be identified from Q predetermined events, wherein Q is an integer greater than M.

6. The EDR system of claim 5, wherein the event selection module and the parameter selection module receive instructions from one of a handheld tool and a satellite communication network, and respectively select from the Q predetermined events and the N predetermined parameters based on the instructions.

7. The EDR system of claim 5, further comprising an event counter module that determines a number of occurrences for each of the Q predetermined events.

8. The EDR system of claim 1, wherein the event recorder module records the first and second sets of parameters after the first and second sets of parameters are selected.

9. An method for recording event data, comprising:

identifying occurrences of a first event and second event of M predetermined events based on operating conditions of an automotive vehicle;

selecting a first set of parameters to record from N predetermined parameters when the first event occurs;

selecting a second set of parameters to record from the N predetermined parameters when the second event occurs;

recording, by an event data recorder (EDR) module, data corresponding to the first set of parameters when the first event occurs; and recording, by the EDR module, data corresponding to the second set of parameters when the second event occurs, wherein M and N are integers greater than 1 and the first set includes at least one parameter that is different from the parameters included in the second set.

10. The method of claim 9, further comprising recording a single value for each parameter included in the first and second sets.

11. The method of claim 9, further comprising recording data corresponding to the first and second sets of parameters for a predetermined period.

12. The method of claim 9, further comprising determining a chronological order of each of the M predetermined events that occur.

13. The method of claim 9, further comprising selecting the M predetermined events to be identified from Q predetermined events, wherein Q is an integer greater than M.

14. The method of claim 13, further comprising receiving instructions from one of a handheld tool and a satellite communication network, and selecting from the Q predetermined events and the N predetermined parameters based on the instructions.

15. The method of claim 13, further comprising determining a number of occurrences for each of the Q predetermined events.

16. The method of claim 9, further comprising:

selectively recording data associated with a first system of the vehicle; and activating a first event data recorder (EDR) module to record the first system data based on a driver input.

17. The method of claim 16, further comprising selectively recording data associated with a second system of the vehicle, wherein the first EDR module selectively activates a second EDR module to record the second system data.

18. The method of claim 17, further comprising activating the second EDR module when the first EDR module is activated.

19. The method of claim 9, further comprising recording the first and second sets of parameters after selecting the first and second sets of parameters.

* * * * *